Figure 1:
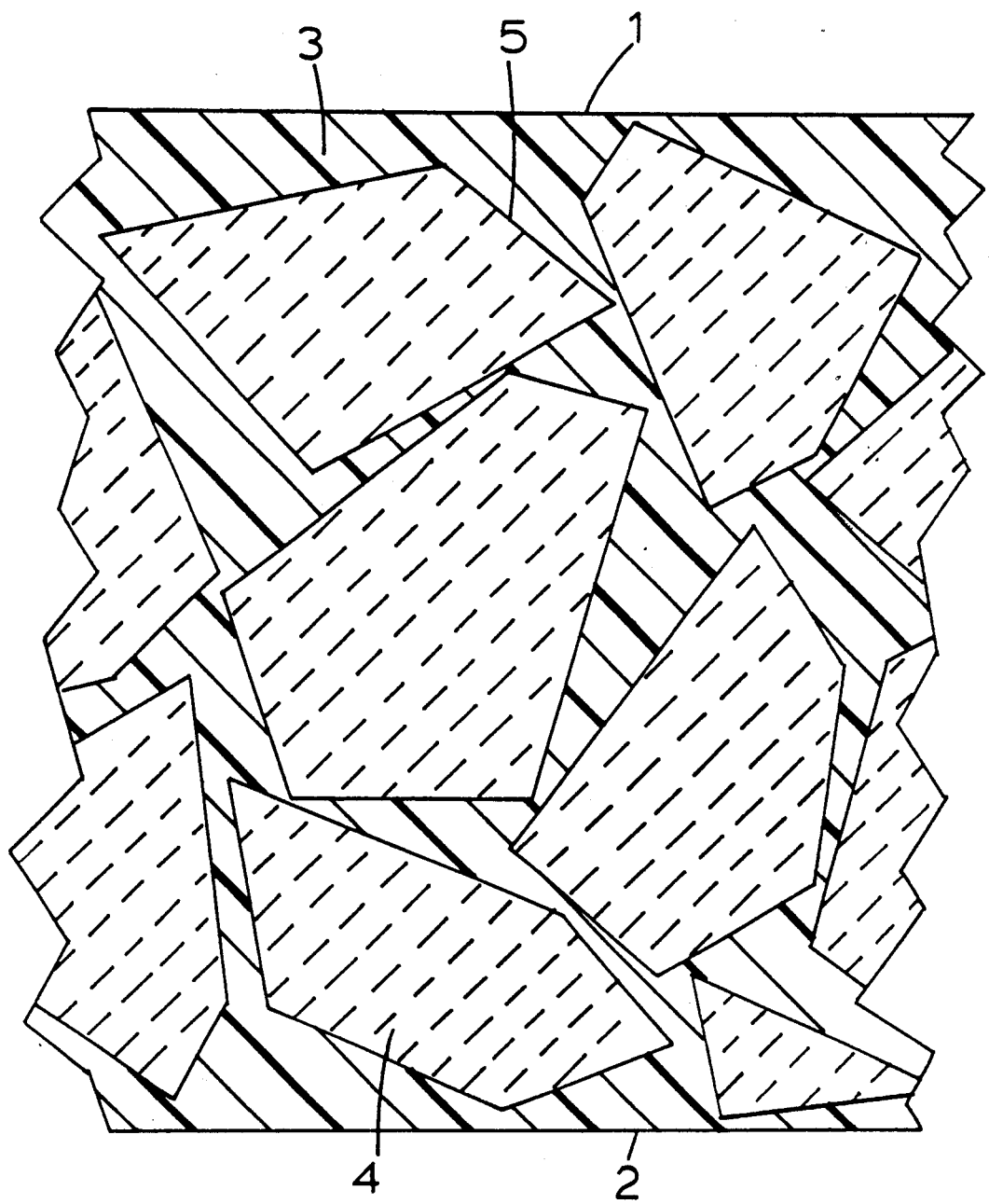

United States Patent [19]

Neefe

[11] Patent Number: 4,997,609

[45] Date of Patent: Mar. 5, 1991

[54] POLYMER BONDING GRAINS OF SAND TO FORM USEFUL OBJECTS

[76] Inventor: Charles W. Neefe, P.O. Box 361, Big Spring, Tex. 79721-0361

[21] Appl. No.: 516,354

[22] Filed: Apr. 30, 1990

[51] Int. Cl.⁵ .............................................. B29C 43/02
[52] U.S. Cl. ...................................... 264/122; 264/37; 264/115
[58] Field of Search ................. 264/37, 122, 115, 116, 264/129, 125, 126; 427/212

[56] References Cited

U.S. PATENT DOCUMENTS

| | | |
|---|---|---|
| 3,671,615 | 6/1972 | Price ..................................... 264/122 |
| 3,804,935 | 4/1974 | Potter et al. .......................... 264/122 |
| 3,897,527 | 7/1975 | Ringdal ................................. 264/37 |
| 3,956,541 | 5/1976 | Pringle ................................. 264/122 |
| 4,115,497 | 9/1978 | Halmo et al. ........................ 264/115 |
| 4,225,640 | 9/1980 | Erb ....................................... 264/122 |
| 4,279,790 | 7/1981 | Nakajima ............................. 264/122 |
| 4,681,719 | 7/1987 | Vogel .................................... 264/122 |

Primary Examiner—Mary Lynn Theisen

[57] ABSTRACT

A method of making useful objects by coating grains of sand with a thin film of sugar. Preparing a polymer mix of granulated plastic containers. Mixing the coated sand with the granulated plastic and placing the sand, resin mix in a mould and heating to 160° C. to 300° C. Applying sufficient pressure to force the air from the mould allowing the hot resin liquid to bond to the coated surface of the grains of sand. The mould and contents are cooled and the useful object removed.

4 Claims, 1 Drawing Sheet

POLYMER BONDING GRAINS OF SAND TO FORM USEFUL OBJECTS

Polymer usage has increased yearly for the past fifty years. The types of polymers available have also increased. New polymers are introduced in the market each year; these new plastics have different physical and chemical characteristics such as melt temperature, hardness and solubility. The reuse of this multitude of plastic materials having widely different physical and chemical properties is most difficult. The separation of polymer types is impossible by visual inspection. Some polyethylene, polyacrylonitrile, polystryene, polyesters and polypropylene look and feel much the same, but may have widely different melt temperatures. High density and low density polyethylene have greatly different properties. Removing labels from containers and residues from within containers is also an economically impossible task.

IN THE DRAWINGS

FIG. 1 shows the polymer and sand mixture in section.

SUBJECT OF THE INVENTION

A method has been developed whereby empty polymer containers can be granulated, mixed with sand and reused to make useful objects without sorting, removing labels or cleaning the containers.

TYPES OF POLYMERS USED

The most important plastics obtained by direct polymerization are also those which are the most important in terms of production volume, namely the polyolefins, the vinyl chloride polymers and the styrene polymers. These three polymers account for about 67% (polyolefins 33%, vinyl chloride polymers 20% and styrene polymers 14%) of the total annual plastics production in the West. The most important polyolefins are the polyethylenes and polypropylenes.

Thermoplastics are plastics which soften when heated but harden again when they are cooled, and this allows them to be shaped very easily. Softening and rehardening does not significantly alter the properties of a thermoplastic. As it is heated a thermoplastic first becomes elastic, like rubber, and then completely plastic, like a very viscous liquid.

Extrusion moulding, carried out in an extruder, is a common method of shaping thermoplastics. An extruder consists of a heated pressure-resistant barrel in which there is a helical screw, as in a domestic mincer (meat grinder). The screw conveys granules of the plastic through a heated die at a temperature of about 200° C. (392° F.) and a pressure of from 100 to 300 bar (1450 to 4350 psi). A wide variety of differently shaped products can be made by this method, depending on the shape of the die aperture. If it is circular, rods or filaments are produced, if it is annular, pipes and tubes are formed and if it is a slit, plastic sheeting or film will be produced. The continuous products emerging from the extruder die are cooled by air, water, cooled rollers or by contact with cooled metal surfaces which give the final exact shape to the section. The finished product is then rolled up or cut into suitable lengths.

Injection moulding is one of the most important methods of producing shaped articles in large numbers. As in an extruder, the plastic is softened by being passed along a heated barrel by means of a screw. However, the screw has the additional function of a ram, which injects the softened plastic very rapidly into a cooled steel mould at temperatures of from about 180° to 300° C. (336° to 572° F.) and pressures of 1000 bar (14,500 psi) or more. After cooling, the mould opens and the article is removed.

Blow moulding is a process used to manufacture hollow articles with small openings such as bottles, cans, drums, tanks and toys. A piece of softened plastics (frequently polyethylene) tubing is extruded and introduced into a two-piece blow-mould. As the mould closed it presses one end of the tubular section together to seal it. Compressed air is blown into the other end of the tube until it fits against the cooled mould and solidifies. The mould is then opened and the article is removed.

Thermoforming is a process for making shaped articles such as bowls or beakers from plastic sheeting or film. The sheeting or film is heated with infra-red radiation to a temperature of between 120° and 180° C. (248° to 356° F.) until it is soft. It is then sucked against single-section mould by applying a vacuum. After cooling (solidfying), the moulded article is separated from the remainder of the sheet.

In rotational moulding, plastics powder is placed in a heated hollow mould of metal, and the latter is rotated slowly about two axes which are perpendicular to each other. In this way the powder melts and is distributed evenly over the whole inner surface of the mould. After cooling, the mould is opened and the moulded hollow article is removed.

Thermosetting resins may also be used in quantities found in plastic containers. Thermosetting plastics are not commonly used for packaging due to the high cost of fabrication. The small quantities used are welcomed in the granulated mix.

Resins such as polyethylene have a stable molecular structure and survive many years under severe atmospheric conditions. This fact makes them useful for many outdoor applications such as boat docks and fence posts.

THE INVENTION IS CARRIED OUT AS FOLLOWS

The empty plastic containers with labels outside and residue inside are passed through a standard plastic granulator and reduced to small pieces resembling multicolored sawdust. Sand (either beach sand or blow sand from sand dunes) is mixed with sugar.

Sucrose occurs in sugar cane, sugar beet, maple sugar, and honey. It is one of the most widely produced and utilized of all organic compounds. The average American manages to eat his own weight in sucrose every year. The formula for sucrose is $C_{12}H_{22}O_{11}$. Sucrose melts at 160° C. When heated to 200° C., it begins to decompose, slowly losing water a leaving a brown, soluble mass called caramel. The sugar may be in several forms, finely divided raw or refined sugar, also syrup may be used, and the sand dried to form a thin film of sugar on the sand particles.

Sugar is added to the sand in amounts of from 0.05% to 5.0% sugar by weight and allowed to form a coating on the individual grains of sand.

Silicon Dioxide $SiO_2$ is found in many different forms in nature. In large, transparent, six-sided prisms with pyramidal ends it is known as quartz or rock crystal. Sand (partly disintegrated quartz) is used in glass manufacture and in many other industries and is found on beaches and sand dunes.

The sugar coated sand is mixed with the granulated plastic mix in amounts of from 25% to 75% granulated resin by weight. The sand and granulated polymers are placed in a compression mould and heated to 225° C. and the softened polymer mixture is compressed into the mould to remove the air. The resins bond to the coated sand to form a strong two phase reinforced material.

DESCRIPTION OF THE INVENTION

Discarded plastic containers having labels on the outside and residue of contents on the inside are granulated using standard industry granulating machines. The granulated resins are mixed to obtain a uniform distribution of polymer types. Sand particles (4,FIG. 1) are surface coated with sugar (5,FIG. 1). The sugar coated sand is mixed with the granulated plastic 50% each by weight. The mixture of sand and resins are placed in a mould and heated 160° C. to 300° C. At a temperature of 160° C. the sugar begins to melt; at 200° C. the sugar is forming a darker and harder substance and the plastic granules are beginning to soften. Pressure is applied to the sand and resin mixture by moving one side of the mould inward to remove air. At 225° C. the resins have melted into a viscous mass. The pressure is then increased to 500 pounds per square inch to remove all air and force the resins against the mould surface. The sand particles (4, FIG. 1) are encased in the resins (3, FIG. 1). The caramelized sugar coating (5, FIG. 1) allows the liquid resins (3, FIG. 1) to adhere to the surface of the sand (4, FIG. 1). The surfaces (1 and 2, FIG. 1) are smooth and formed by inner surfaces of the mould. The formed object is allowed to cool and is removed from the mould.

Sawdust has been successfully substituted for sand. When sawdust or shredded paper are substituted for sand the sugar adhesive is not required. A mixture of sand and shredded high quality clay-coated paper which cannot be recycled may be used with excellent results.

When the sugar adhesive layer is omitted from the surface of the sand particles the physical strength of the moulded member is reduced.

I claim:

1. A method of making useful objects from a mixture of granulated discarded thermoplastics and sand by the steps of, placing a sugar coating on the surface of the sand particles, mixing the granulated thermoplastic and coated sand, placing the granulated thermoplastic and sand in a mould, applying sufficient heat to soften the thermoplastic, allowing the thermoplastic to adhere to the surface of the coated sand particles, applying sufficient pressure to remove the air from within the mould, removing the useful moulded object from the mould.

2. A method of making useful objects from a mixture of granulated thermoplastic resins and sand by the steps of, placing a coating of sugar on the surface of the sand particles, mixing the granulated thermoplastic and sugar coated sand, placing the granulated thermoplastic and sand mixture in a mould, applying sufficient heat to caramelize the sugar coating present on the sand particles and soften the thermoplastic resins, applying sufficient pressure to remove the air from within the mould, allowing the heated thermoplastic to adhere to the surface of the coated sand particles, removing the useful moulded object from the mould.

3. A method as in claim 1 wherein the mould and useful object are allowed to cool before removing the useful object from the mould.

4. A method as in claim 2 wherein the mould and useful object are allowed to cool before removing the useful object from the mould.

* * * * *